Patented Oct. 20, 1925.

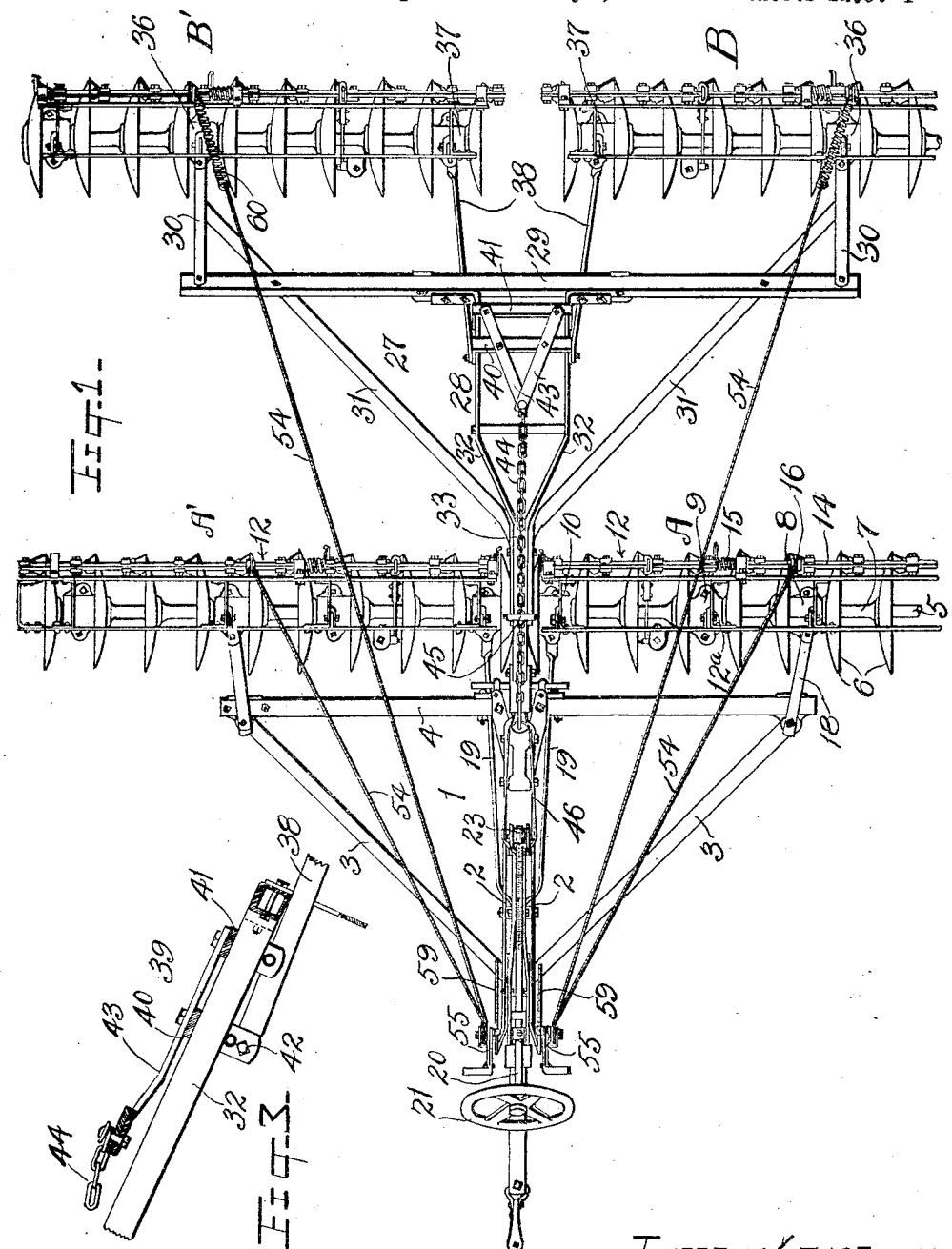

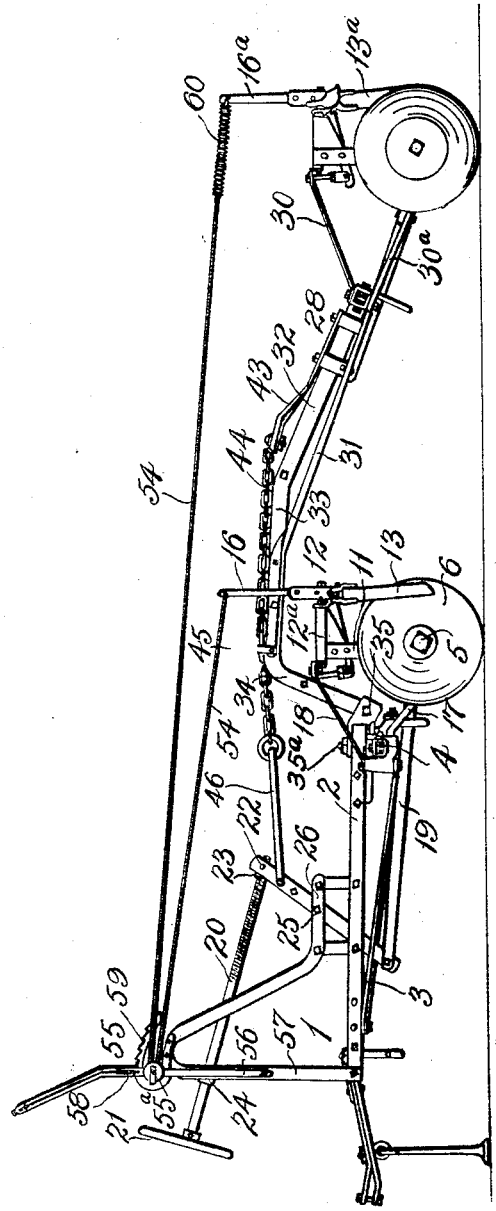

1,558,131

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK-HARROW MECHANISM.

Application filed July 7, 1919, Serial No. 309,008. Renewed November 17, 1924.

*To all whom it may concern:*

Be it known that I, CHARLES H. WHITE, citizen of the United States, residing at Moline, in the county of Rock Island and State of Illinois, have invented certain new and useful Improvements in Disk-Harrow Mechanisms, of which the following is a specification, reference being had herein to the accompanying drawing.

This invention relates to improvements in disk harrows, particularly those each of which has a front frame or draft frame, and a rear, laterally swinging, frame flexibly connected to the front frame or draft devices, the rear frame having disk gangs connected thereto so as to be adjustably movable in relation to it.

One object is to provide an adjusting mechanism for the gangs carried by the rear frame by which they can be moved from one angle to another in relation to the line of advance by a power device on the main frame or draft device, which is held relatively fixed in relation to the draft lines. Another object is to provide a gang adjusting mechanism for the gangs connected to the front frame, and an adjusting mechanism for those connected with the rear frame which can be operated at will to adjust the gangs of the rear frame at all times irrespective of the differing positions which the rear element of the harrow may occupy in relation to the front element, and of such character that lateral swinging of the rear harrow unit relatively to the front unit will not affect the setting of the rear gangs.

In the drawings,

Figure 1 is a top plan view of a disk harrow mechanism embodying my improvements.

Figure 2 is a side elevation.

Figure 3 is a view on an enlarged scale partly in section, partly in side elevation, of some of the parts for transmitting power to the rear gangs for adjusting them.

A main frame or front frame 1 is formed of central longitudinal bars 2, inclined side bars 3, 3, and a cross bar 4; these bars being preferably of wrought metal and the frame, as an entirety, being substantially similar to some of those now in use.

Immediately behind this frame is mounted a front harrow unit comprising two disk gangs A, A¹. These also may be of any preferred construction suitable for the purposes of this mechanism. As shown, each gang comprises a central shaft 5, concavo-convex disks 6 and disk-spacing and bracing thimble tubes 7. Each thimble has radially expanded bosses at its ends to provide a wide engagement with the central portion of the disk. At the inner end of the gang, immediately inside of the innermost disk, there is a large boss adapted to abut against that on the opposite gang for taking the inward endwise thrust. Each gang, as shown, has three boxes at 8, 9 and 10. From these boxes there rise up standards 11 which support a superadjacent frame 12ª. This frame supports a scraper system indicated as an entirety by 12 comprising a series of scrapers 13, one for the concave side of each disk, a scraper-carrying rod or bar 14 held, longitudinally, in normal position by a spring 15, and a lever 16.

Each gang of the front unit is attached to the frame 1 by a lower pivoted link 17, and an upper link 18. These links allow endwise movement outward and inward of the gangs. These links 17, 18 are connected to the outermost boxes 8 of the gang axle systems. The inner boxes 10 are also connected to the front frame by adjustable drag bars 19.

The apparatus shown may be drawn by the engine or tractor, and in such case the operator rides on the platform at the rear end of the engine and the harrow mechanism is provided with devices by which the operator can exert considerable power in adjusting the gangs. When the latter are in alignment the disks are inactive in respect to engaging with and forming furrows in, the soil, they, at such time, merely rolling as wheels on the surface for supporting the parts carried by them. When the disks are to be put in operation each gang must be thrown back at its inner end in order to turn forward the concave sides of the disks. The greater the angles to the line of draft of the planes of the cutting edges of the disks, the more efficiently will the latter engage with the soil, and the greater will be the resistance to the forward movement.

To vary the angle of the gangs, use is made of a screw rod 20 having a hand wheel 21 accessible to the operator on the engine platform. This rod is connected with the upper end of a lever 22 by a nut 23 engaging with the rod and swiveled in the lever 22. At 24 there is a swiveled sleeve supporting the forward end of the rod 20 and permitting its ends to swing vertically. The lever 22 is at 25 pivoted to the frame 1 or to a supplemental support 26 secured to this frame. The lower end of the lever 22 is pivotally connected to the draw bars 19 of the gangs.

When the operator desires to have the inner ends of the gangs of the front unit move backward to operative positions, he rotates the screw rod in such way as to permit the links 19 to move longitudinally rearward. But little force is required to move the inner ends of the gangs backward inasmuch as the governing link connections at 17, 18 of each gang system are positioned nearer to the outer ends of the gangs than to the inner ends. As soon as the gangs begin to turn, the greater earth resistance at the inner ends causes the latter to swing backward. However, if power is required for this, it can be readily applied by the operator through the screw rod, and, on the other hand, when he desires to bring the gangs to transverse alignment, the resistance of the soil is overcome by means of the powerful transmitting devices which I have provided. No ratchets or locking dogs are required for holding the gangs at any predetermined angle, the thread and nut at 23 being self-locking at any position to which the rod may be used.

To that part of the apparatus above described is connected the rear harrow unit. It comprises the disk gangs B, B¹, each of which is approximately a duplicate of the front gangs A, A¹, except that the rear gangs are in reversed position; that is to say, are so arranged that their disks have their concave faces turned inward and their convex faces turned outward.

These rear gangs are supported and drawn by a frame 27 comprising a central longitudinally disposed part 28, cross bar 29, end bars 30, and 30ª, and the forwardly extending and converging brace bars 31. The central frame member 28 is formed of longitudinal bars 32, which, at their rear ends, are inclined downward, the central parts 33 being in horizontal planes somewhat above the front disk frames, and the forward ends 34 extending downward to their point of attachment to the front frame 1. The front parts of these bars and the elevated horizontal parts 33 are close together to form a rigid connecting arm 34, while the rear parts at 32, are spread apart, as shown in Figure 1, to provide a light expanded frame element. The connecting arm 34, is connected to the front frame 1 by a coupling 35 and a substantially vertical pivot 35ª to freely swing, bodily, toward the right or toward the left, independently, more or less, of the gangs A, A¹ of the front unit. Such freedom of relative swing is necessary both when the apparatus as a whole is being turned at the end of a transit across the field, and also at times during a traverse in correspondence with variations in the surface of the soil. Generally, however, the four gang elements are, when in operation, positioned similarly in respect to the central vertical longitudinal plane through this mechanism. The gangs B, B¹ are pivotally connected to the end bars 30 and 30ª of the rear frame, the pivots joining the bars to bearing boxes 36. The inner end boxes 37 of the rear gangs are held by pivoted drag bars or links 38 which extend forward to their adjusting devices. The latter comprise a sliding frame at 39 having transverse bars 40, 41, riding slidably on the frame bars 32. The cross bar 40 is at 42 pivoted to the drag bars 38 of the rear gangs. The bars 40, 41 are bound together and braced by short inclined bars 43. To the forward ends of these brace bars 43 is connected a chain 44 which extends forward over the top of the forward portion of the rear frame to and through a loop guide 45 carried by the front bar part 33, 34 of the frame and situated in or close to the vertical axis of the pivot or hinge 35ª. The chain extends forward beyond this loop guide 45 and at a point that is substantially in line with the vertical axis of the pivot 35ª it is flexibly connected to a link 46 that is connected with the aforesaid lever 22. By providing a connection between the angling devices on the rear frame and the actuating means therefor on the front frame that is flexible laterally at a point substantially in line with the vertical axis of the pivot 35ª, the rear unit may swing laterally relatively to the front unit without incidentally causing an angular movement of the rear gangs with relation to each other, as hereinafter further explained. The connection of the chain with the lever 22 is at a point higher than the pivot 25 of said lever and therefore when the operator by means of the screw rod 20 and hand wheel 21 swings the upper end of lever 22 forward (as he does when swinging the inner ends of the front gangs rearward) he draws forward on the chain 44 and on the rear drag bars 38 and swings the inner ends of the rear gangs B, B¹ forward. And, conversely, when he rotates the screw rod 20 in the opposite direction and draws the inner ends of the front gangs A, A¹ forward toward alignment he moves the lever 22 at its upper end backward and this permits the strain from the earth on the rear disks to cause the rearward swinging of the inner ends of the rear gangs.

If the parts be properly constructed and related and the proper points be selected for pivoting the gangs of the front system and the gangs of the rear system there will be, approximately, a compensation in respect to the resistance to be overcome in moving the inner ends. The inner ends of the front and rear gangs more oppositely. The earth's resistance tends to swing the inner ends of the front gangs backward and the force coming from this is utilized to draw the inner ends of the rear gangs forward; and vice versa; so that there is but little increase of resistance for the operator to overcome when actuating the screw rod 20.

The chain abutment or guide 45 being, as stated, in or near the vertical line of the axis around which the rear frame swings, and the chain being laterally flexible substantially over or in line with the axis of the vertical pivot 35ª, the chain and the attachments at its ends are, as a system divided into two parts, each having a substantially fixed length, one part extending from the abutment or guide 45 to the lever 22 and the other extending from the abutment 45 to the innermost bearings of the rear gang axles. This provides for swinging the rear frame and the rear gangs to the right or to the left around their main vertical hinge without having any substantial variations in the tension on the chain and its attachments and therefore the rear gangs remain fixed at the angles to which they are set by the operator through the rod 20 and the lever 22.

In the machine illustrated I have provided devices for effecting the scraping of all of the disks, simultaneously, in both of the right hand gangs; and also of all those in the left hand gangs, but such mechanism forms the subject-matter of a divisional application, and, therefore, is not described or claimed herein.

I have described in detail, more or less, all of the parts of a machine of the form of that selected for illustration; but in many respects there can be modification. For example, instead of the power device 20, 22, and 23, illustrated, one of different form can be employed. And the gang adjusting power transmitter comprising link 46, chain 44, and sliding parts at 38, 40 and 41, can be modified, provided the essential matters referred to be retained. As already noted, this part of the mechanism permits the rear frame to swing freely laterally without affecting or varying materially the relative actions of the parts in adjusting the rear gangs, the rear element of the gang adjuster vibrating laterally around a vertical axis which is substantially fixed in relation to the power device and also substantially fixed in relation to the rear gangs, irrespective of any variation of their positions relative to the front gangs.

What I claim is:

1. The combination of a front frame, the disk gangs connected thereto, the rear laterally swinging frame flexibly connected to the front frame, the rear gangs connected to the rear frame and adjustably movable relatively thereto, the adjusting device for the rear gangs having a rear element supported on and movable longitudinally of the rear frame, and a front element supported on the front frame and held on lines approximately fixed relatively to said frame, and adapted to exert draft on the rear element and on the rear gangs, the aforesaid front and rear elements being arranged to permanently have fixed operative connection with both rear gangs and to maintain substantially unchanged the adjusted cutting angle of the rear gangs during their lateral swinging and uniformly actuate them for adjustment in all angular positions of the rear frame.

2. The combination of the front frame, the disk gangs connected thereto, the rear frame connected to the front frame and swinging laterally relatively thereto, the rear gangs connected to the rear frame and adjustable relatively thereto, the adjusting device for the rear gangs having a rear element which swings laterally with the rear frame and has permanently fixed similar operative connections with both rear gangs, and a front element flexibly connected to the rear element and held in position on approximately fixed lines and adapted to exert draft uniformly on both rear gangs through the rear element at all angles of inclination of the rear relatively to the front element.

3. The combination of the front frame, the disk gangs connected thereto, the rear frame connected to the front frame and swinging laterally relatively thereto, the rear gangs connected to the rear frame and adjustably movable relatively thereto, the adjusting device for the rear gangs supported partly on the rear frame and partly on the front frame, and held in fixed operative connection permanently with both rear gangs in all of their positions, and means for preventing the front part of the adjusting device from swinging laterally with the rear frame.

4. The combination of the front frame, the disk gangs connected thereto, the rear laterally swinging frame connected to the front frame, the manually operated device on the front frame, the rear gangs joined by connecting devices to the rear frame, and adjustably movable relative to said frame, said connecting devices varying in their distances from said manually operated device when they swing with the rear frame, the adjusting device for the rear gangs extending therefrom to the manually operated device, and means for maintaining a constant operative length for the adjusting device and compensating for said varying distances of the connecting devices of the rear gangs from the manually operated device.

5. The combination of the front frame, the disk gangs connected thereto, the rear laterally swinging frame flexibly connected to the front frame, a manually operated device on the front frame at an approximately fixed distance from the vertical axial line on which the rear frame is pivoted, an adjusting device for moving the rear gangs on the rear frame and actuated by the manually operated device, said adjusting device extending from the manually operated device to said vertical axial line and from said vertical axial line to the rear gangs, and arranged to cause the latter to swing laterally with the rear frame without varying the distance over which the power is transmitted.

6. The combination of the front frame, the disk gangs connected thereto, the rear frame connected to the front frame to swing laterally relatively thereto, the rear gangs connected to the rear frame and movable relatively thereto, an adjusting device for the rear gangs, devices movable longitudinally of the rear frame and connecting the adjusting device to both of the rear gangs to provide permanently operative connection therewith and uniformly actuate them for adjustment in all angular positions of the rear frame, a manually operated device on the front frame connected to the adjusting device, and means near the said axis to prevent part of the adjusting device from swinging laterally with the rear frame.

7. The combination of the front frame, the disk gangs connected thereto, the rear frame pivoted to the front frame to swing laterally relatively thereto, the rear gangs connected to the rear frame and adjustably movable relatively thereto, the adjusting device for the rear gangs having a rear section connected to the gangs and extending to said axis, and a forward power receiving section extending forward from said axis and held against moving laterally with the rear frame, said rear and forward sections of the gang adjusting device being laterally flexible around the said fixed axis.

8. The combination of the front frame, the disk gangs connected thereto and adjustably movable thereon, the rear laterally swinging frame, the manually operated device on the front frame, the rear gangs connected to the rear frame and movable therewith to positions of varying distances from said manually operated device, the power transmitting adjusting device for the rear gangs connecting them to the said manually operated device and acting along lines which are fixed relatively to the rear frame, and power transmitting devices for the front gangs connecting them to said manually operated device.

9. The combination of the front frame, the disk gangs adjustably connected thereto, the rear laterally swinging frame, the rear gangs adjustably connected thereto, the said manually operated device on the front frame, the pivot like device connecting the rear frame to the front frame and positioned on transverse lines immediately adjacent those of the front disk gangs and behind the transverse lines of the power device, the power transmitting adjusting device for the rear gangs extending on fixed longitudinal lines forward from the pivot to said manually operated device and having its rear end part swinging laterally with the frame at the rear of the vertical axial line of the pivot, and gang adjusting devices extending from the front gangs to said manually operated device.

10. The combination of the front frame, the disk gangs connected thereto, the laterally swinging rear frame, the disk gangs adjustably connected thereto, the manually operated adjusting device for the rear gangs having its rear end part connected thereto, a front end part adapted to receive power and an intermediate part formed of a flexible draft device, and means engaging with the said intermediate flexible part to cause the rear end part thereof to flex laterally when the rear frame swings and to hold the front end part on approximately fixed longitudinal lines.

11. The combination of a front frame, angularly adjustable disk gangs connected thereto, a rear frame connected with said front frame to swing laterally, rear gangs connected with said rear frame and adjustably movable relatively thereto, devices carried by the rear frame operable to angularly adjust the rear gangs, means carried by the front frame for actuating said devices, and an operating connection between said actuating means and said devices, said connection being laterally flexible at a point approximately in line with the axis about which said rear frame swings laterally.

12. The combination of a front frame, angularly adjustable disk gangs connected thereto, a rear frame connected with said front frame to swing laterally, rear gangs connected with said rear frame and adjustably movable relatively thereto, devices carried by the rear frame operable to angularly adjust the rear gangs, means carried by the front frame for actuating said devices, an operating connection between said actuating means and said devices, said connection being laterally flexible at a point approximately in line with the axis about which said rear frame swings laterally, and devices operable by said actuating means to angularly adjust the front gangs.

13. In a double disk harrow, the combination with a front frame, angularly adjustable disk gangs connected therewith, a rear frame connected with said front frame to swing laterally, angularly adjustable disk gangs connected with said rear frame, and means carried by said front frame and operable to angularly adjust the rear gangs, said means having a rear gang connection laterally flexible approximately in line with the axis about which said rear frame swings laterally, whereby said rear frame may swing laterally relatively to the front frame without incidentally causing the rear gangs to move angularly relatively to each other.

14. In a double disk harrow, the combination with a front frame, angularly adjustable disk gangs connected therewith, a rear frame connected with said front frame to swing laterally, angularly adjustable disk gangs connected with said rear frame, gang adjusting means carried by said front frame and operable to angularly adjust the front and rear gangs, said means having a rear gang connection laterally flexible approximately in line with the axis about which said rear frame swings laterally, whereby said rear frame may swing laterally relatively to the front frame without incidentally causing the rear gangs to move angularly relatively to each other.

15. In a double disk harrow the combination with a front frame, angular adjustable disk gangs connected therewith, a rear frame connected with said front frame to swing laterally relatively thereto, angularly adjustable disk gangs connected with said rear frame, means mounted on the front frame operable to angularly adjust the front gangs, and means operable from the front of the harrow to angularly adjust the rear gangs, the latter means being laterally flexible approximately in line with the axis about which the rear frame swings laterally.

16. In a double disk harrow, the combination with a front frame, angularly adjustable disk gangs connected therewith, a rear frame connected with said front frame to swing laterally relatively thereto, angularly adjustable disk gangs connected with said rear frame, gang adjusting means mounted on the front frame operable to angularly adjust the front gangs and a connection laterally flexible approximately in line with the axis about which said rear frame swings laterally, operable by said gang adjusting means to angularly adjust the rear gangs.

17. The combination of a front frame, the disk gangs connected thereto, the rear laterally swinging frame flexibly connected to the front frame, the rear gangs connected to the rear frame and adjustably movable relatively thereto, the adjusting device for the rear gangs comprising a rear element supported on and movable longitudinally of the rear frame, and a front element supported on the front frame and held on lines approximately fixed relatively to said frame, and adapted to exert draft on the rear element and on the rear gangs, the aforesaid front and rear elements being arranged to permanently have fixed operative connection with both rear gangs, and uniformly actuating them for adjustment in all angular positions of the rear frame.

18. The combination of the front frame, the disk gangs connected thereto, the rear frame connected to the front frame and swinging laterally relatively thereto, the rear gangs connected to the rear frame and adjustable relatively thereto, the adjusting device for the rear gangs comprising a rear element which swings laterally with the rear frame and has permanently fixed similar operative connections with both rear gangs, and a front element flexibly connected to the rear element and held in position on the front frame on approximately fixed lines relatively to said frame, and adapted to exert draft uniformly on both rear gangs through the rear element at all angles of inclination of the rear relatively to the front element.

19. The combination of the front frame, the disk gangs connected thereto, the rear frame connected to the front frame and swinging laterally relatively thereto, the rear gangs connected to the rear frame and adjustably movable relatively thereto, the adjusting device for the rear gangs partly supported on the rear frame and partly on the front frame and held in fixed operative connection permanently with both rear gangs in all of their positions, and means permitting the rear part of the adjusting device to swing laterally with the rear frame relatively to the front part of said adjusting device.

In testimony whereof I affix my signature.

CHARLES H. WHITE.

Certificate of Correction.

It is hereby certified that in Letters Patent No. 1,558,131, granted October 20, 1925, upon the application of Charles H. White, of Moline, Illinois, for an improvement in "Disk-Harrow Mechanisms," errors appear in the printed specification requiring correction as follows: Page 3, line 4, for the word "more" read *more;* page 4, line 65, claim 9, strike out the word "said;" line 71, strike out the word "power" and insert instead *said manually operated;* page 5, line 26, claim 15, after the word "harrow" insert a comma, and line 27, for the word "angular" read *angularly;* same page, line 47, claim 16, after the word "gangs" insert a comma; and that the said Letters Patent should be read with these corrections therein that the same may conform to the record of the case in the Patent Office.

Signed and sealed this 8th day of December, A. D. 1925.

[SEAL.]

WM. A. KINNAN,
*Acting Commissioner of Patents.*